April 23, 1935. B. P. HANSON 1,998,621
AUTOMOBILE LUGGAGE CARRIER
Original Filed Aug. 15, 1929
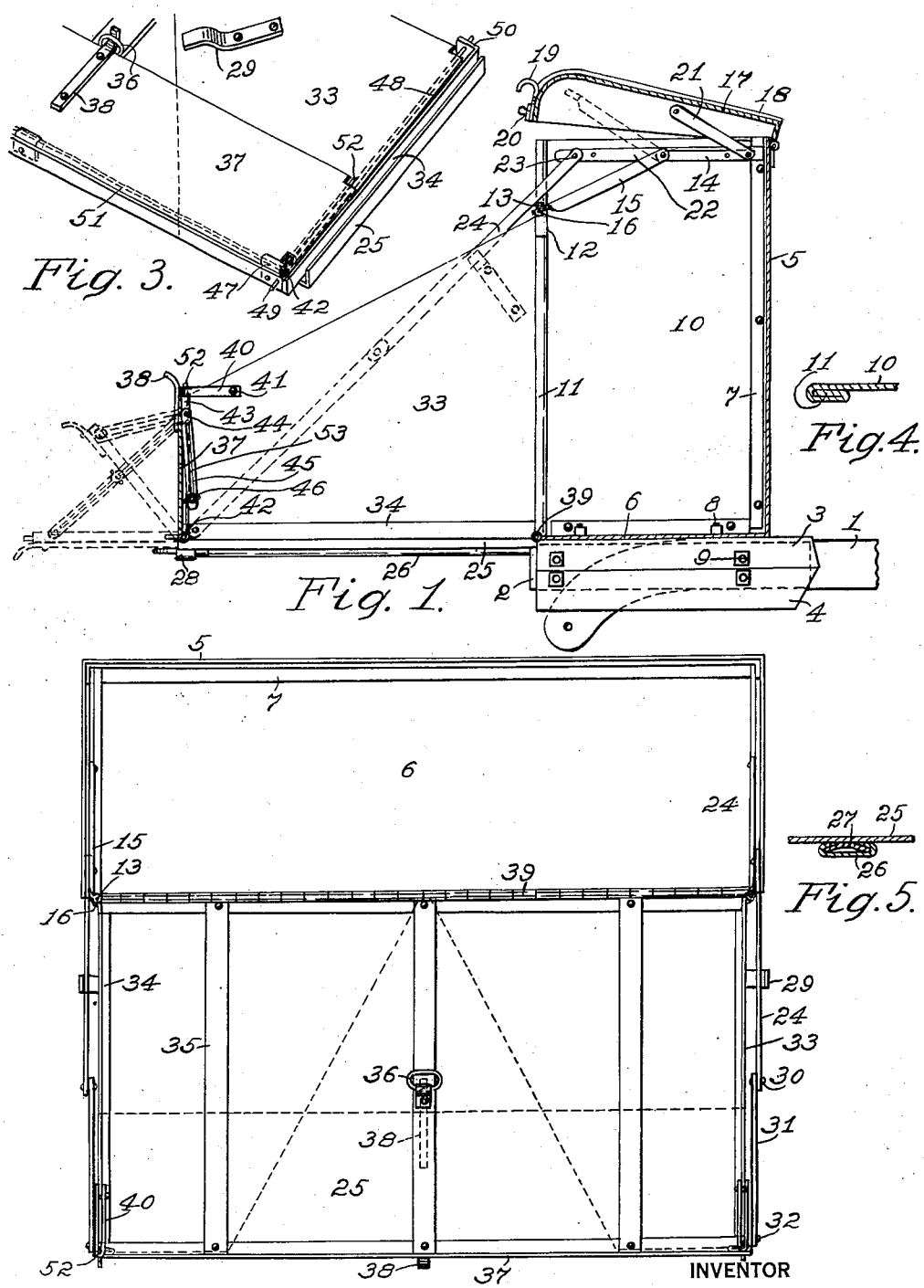
INVENTOR
B. P. Hanson,
BY
ATTORNEY

UNITED STATES PATENT OFFICE 1,998,621

AUTOMOBILE LUGGAGE CARRIER

Bennie P. Hanson, Cedar Falls, Iowa, assignor to George Colvin Kennedy, Waterloo, Iowa Application August 15, 1929, Serial No. 386,140
Renewed September 17, 1934

7 Claims. (Cl. 224—29)

My invention relates to improvements in automobile luggage carriers, and the object of my improvements is to supply a perfected carrier of this class, adapted to be removably mounted upon the rear part of an automobile or other vehicle, and having relatively movable and fixed parts which cooperate in one relation as a closed openable container, and in another relation as an extended open container for receiving conveniently and transporting goods, wares, merchandise or travelers' luggage.

Another object of my improvements is to combine with the rear opening fixed carrier, a movable and extensible carrier part which when extended has extensible and foldable side flaps and an openable end gate cooperating therewith to retain goods on said carrier part against displacements, the opened end gate further serving together with adjustable supports to extend the said carrier part, and to fold over upon the side flaps when the latter are retracted inwardly, to be secured thereupon, before the carrier part is moved to become a rear closure for the fixed carrier.

Another object of my improvements is to provide auxiliary linking and securing means for the carrier cover, and the extensible carrier part in both its closed and extended positions.

Another object of my improvements is to supply sectional reinforcing means for the extensible carrier part and the cover of the fixed carrier, and other reinforcing means for parts of the latter.

These improvements with others to be hereinafter mentioned, I have successfully constructed in my luggage carrier, and they are described and claimed herein, and illustrated by the accompanying drawing, in which Fig. 1 is a medial longitudinal vertical section of my device as fully extended; the dotted lines denoting otherwise concealed parts of certain elements, or different positions of adjustment of the end gate. Fig. 2 is a top plan of my device as extended, with the top closure removed, and the dotted lines indicating the collapsed positions of the hinged side flaps and rear end gate of the movable rear closure. Fig. 3 is a detail perspective view of a portion of the said rear closure with said parts collapsed, and Figs. 4 and 5 are sectional details respectively of a side wall, and of the rear closure, fragmentarily.

Minor modifications or changes in the exemplification of my said invention, are nevertheless within the scope of the appended claims.

The numeral 1 denotes one of the chassis frame rear extensions, and 2 a plate bolted thereon together with an angle-bar 3 on each side of the frame-bars, and an additional plate 4, all secured by the bolts 9. My improved luggage carrier has a fixed front, side plates and bottom plate respectively at 5, 10 and 6, the bottom plate being removably secured on the angle-bars 3 by bolts 8. The carrier preferably has stiffening inner angle-bars 7 secured within its interior angles. The open top of the carrier has a forwardly swinging closure 17 hinged thereto at the front, said closure having depending flanges, and longitudinal outer reinforcing sectional bars 18. The closure has a lock part 20 thereon, or a pair thereof spaced apart therealong. Along the inner face at the top of each side wall 10 is fixed a reinforcing bar 22. Upon the middle part of each bar 22 is pivoted one end of a medially pivoted collapsible connector composed of the parts 14 and 21, the outer end of the latter being pivoted to the inner face of the side flange of said closure, and which connector limits the swing of the closure forwardly, to a position just beyond the vertical to the front, to permit complete access to the open top of the carrier, or to allow the upper parts of objects carried to project above the carrier.

The numeral 25 denotes a swinging closure for the open rear end of said carrier, and having raised side flanges. Secured within said closure and flanges is an angle-bar frame member 34 around the rear of the closure when extended and along its sides, and the closure is further reinforced by a number of longitudinal bars 35 along its inner face. The closure as shown extended in Fig. 2, shows the forward end (at the bottom when closed) alternately roll-flanged in places 39 to cooperate with an inclosed rod and alternately roll-flanged parts of the rear edge or margin of the bottom plate 6 to hinge the closure to the carrier.

The closure 25 is supported in a horizontally extended position in alinement with the bottom 6 of the carrier, by means of the sectional side hangers composed of parts 24 and 31 pivoted together at 30 and to the closure at 32 and the carrier sides at 23 with stops 29 on the side flaps 33.

The side flaps 33 have downwardly and rearwardly sloping upper edges, but the direction thereof may be otherwise. The flaps are at their lower margins roll-flanged at 48 to receive rods 49 which project at their ends into bearing holes in the rear angle bar of the closure and in an angular termination at the front of each angle-bar 34 at 50. These side flaps, as indicated by the dotted lines on Fig. 2, may be swung inwardly and downwardly upon the inner face of the closure 25 when lowered. Short roll-flanges 12 at the upper front edges of the flaps 33 seat vertical pins 13, and when the flaps are raised as shown in Fig. 1, arms 15 pivoted terminally on the bars 22 have their terminal eyes 16 seated upon said pins 13, thus helping to releasably fasten the flaps in that position, and taking some of the loading strain from the lower pivot-bolts 32 which hinge the lower sections of the jointed hangers 24 to the angle-bars 34 of the closure 25. The dotted lines below the top closure 17 in Fig. 1 show the released upper position of each arm 15.

The rear vertical margins of the carrier side walls 10 are flanged or folded upon themselves inwardly, as shown in Fig. 4, in three-ply, which greatly stiffens and strengthens these margins and the side walls 10, to resist the considerable strains set up by heavy loads, when the vehicle is rapidly traversing rough roads.

When closed, the rear closure 25 has a pair of lock members 28 fastened thereon at its rear transverse edge, to cooperate with the other locking members 20 on the cover 17. A downwardly hooked finger-hold 19 or a pair thereof, may be fixed on said cover 17 above the lock parts 20, for convenience in lifting said cover. The rear closure 25 has a pair of vertically disposed reinforcing devices along its outer surface, fixed thereon, as shown in Fig. 5. Each said device comprises a reinforcing bar 27 having its opposite margins upset outwardly to space them from the closure wall 25 and are spot-welded upon the wall 25. A split tube 26, flattened, is slid over and along each bar 26 to cover it and when plated, as with nickel, is an attractive ornament to the carrier when closed, as also an additional stiffening member. The longitudinal bar devices 18 on the cover 17 may be similarly constructed if desired.

Referring to said Fig. 3, the numeral 37 denotes a movable end-gate for the tiltable closure member 25. The abutting transverse margin 51 of this gate is roll-flanged to seat a rod 42 whose ends project into looped bearing members 47 secured on the inner face of the transverse angle bar 34 of the closure 25. The end margins of the gate 37 are also roll-flanged to receive rods 52 whose upper ends project a short distance to receive thereover looped arms 40 pivoted on bolts 41 to the flaps 33, as shown in Fig. 1, to secure the end gate 37 in closed position when the closure is horizontal, thus providing the closure with a retaining wall all around except where it is hinged at 39. The end gate being hinged as before described, may be tilted downwardly and rearwardly, when the looped arms 40 are released therefrom and to any adjusted positions as far as the horizontal one shown. This is effected by the use of the collapsible sectional hangers or hinge elements 45, hinged to the gate at 44 and to the flap at each side, and connected by means of bolts and wing-nuts as at 46, the bolts passed through slots 53 to permit of adjustments within a total scope of 90 degrees, as indicated by the dotted lines in Fig. 1. The end gate when in its horizontal position, becomes a rearward extension of the closure 25 horizontally, leaving that end of the closure open also, whereby loads of considerable length may project rearwardly upon and across the supported horizontal end gate, which could not conveniently be done were the end gate not so supported when opened. In certain cases, it will be convenient for the end gate to be secured in a sloping position, and by the use of the wing-nuts and bolts movable in the more or less registering slots 53.

When it is desired to close the closure 25 upon the carrier device in advance, initially, the closure being down, the end gate is released at the pins 52 the flaps 33 are swung after release at 13 downwardly upon the closure 25, then the end gate is swung forwardly upon the flaps 33. A loop 36 on the closure 25 is then moved over a curved projecting arm 38 on the end gate, securing the latter upon the flaps, and all securely and compactly upon the closure to take up but little room in the carrier when closed. The latter may be used then as a trunk, with the convenient hinged top cover 17, in placing or removing goods.

Having described my invention, what I claim as new, and desire to secure by Letters Patent, is:

1. In combination, a carrier device having bottom, front and side walls and open at the rear, a rear closure hinged thereto for the open rear thereof, side flaps hinged on said closure to swing inwardly thereupon, means for supporting said closure in its extended position, engaging means on said flaps, engaging means on the inner side walls of the device to engage releasably with the engaging means on said flaps when the latter are extended, means for fastening said flaps to said closure when folded thereupon, and other means for releasably fastening said closure to the carrier device in its closed position.

2. In combination, a carrier device having bottom, front and side walls and being open at the rear, a rear closure hinged thereto to close said open rear part of the carrier, side flaps having rearwardly sloping top edges and at their lower edges hinged on said closure to fold over upon it, means for supporting the closure in its extended position, other means for fastening the closure to the carrier device in its closed position, an end gate hinged to the free end of said closure between said flaps, and means for fastening the end gate releasably to said side flaps when all are extended vertically to surround the closure as the latter is in its extended position.

3. In combination, a carrier device having bottom, front and side walls and open at the rear, a rear closure hinged thereto, means for supporting the closure in an extended position, side flaps hinged to sides of said closure to fold over thereupon, an end gate hinged to the rear part of said closure to fold over said side flaps when the flaps are folded over upon the closure, and means consisting of releasably coengaging members for releasably securing the end gate to the closure in the latter position of both to secure both to the closure.

4. In combination, a carrier device having bottom, front and side walls and open at the rear and top, a rear closure hinged thereto, a top closure hinged thereto, means for supporting the rear closure in an extended position, side flaps hinged on said rear closure to fold thereover without overlapping each other, means for releasably connecting the forward top parts of the flaps when extended to the carrier device, an end gate hinged to the free end of said rear closure, and means for releasably securing the end gate to the side flaps when the latter are extended.

5. In combination, a carrier device having closed bottom, front and side walls and open at the top and rear, a closure for its open top hinged thereto in front, a closure for its open rear hinged thereto at the bottom, an end-gate hinged to the free end of the rear closure, side flaps hinged to the side edges of the rear closure to swing inwardly thereover, the front parts of the flaps having at the top upwardly projecting pins thereon, arms pivoted to the side walls of said device and apertured at their free ends to seat engagingly upon said pins when said side flaps are extended, said end-gate having upwardly projecting pins at its ends, arms pivoted on the inner walls of said side flaps and having their free ends apertured to seat engagingly upon said pins to lock the end-gate extended when the flaps are extended, hinged hanger sections whose outer ends are pivoted respectively to the upper inner walls of the device and to the outer sides of said rear closure, and stops on said side flaps engageable by the upper sections of said hangers when extended to limit their movements in one direction.

6. In combination, a carrier device having a closed bottom, front and side walls and open at the top and rear, a closure for its open top hinged thereto, a closure for its open rear hinged thereto at the bottom, an end-gate hinged to the free end of the rear closure to swing over thereupon, adjustably connected pivoted hanger sections connected to the ends of said end-gate, side flaps hinged to the side edges of the rear closure, the opposite ends of said hanger sections being pivoted to said side flaps, said side flaps and said end-gate having coengaging engaging means to fasten the end-gate releasably when both the end-gate and side flaps are extended, pivotally jointed hangers connected between said side walls and said rear closure, said end-gate overlapping the side flaps when both are collapsed upon the rear closure, means upon the end-gate and rear closure engageable to secure the end-gate and flaps upon the closure, and means for securing the flaps to the device when extended.

7. An attachment for automobiles comprising a casing, said casing formed of a bottom wall, upright walls and a top wall, the latter being hingedly connected to one of said upright walls, one of said upright walls being hingedly secured along one side thereof to the bottom wall and the other upright walls fixed to the bottom wall whereby the hingedly connected upright wall may swing in a path from a vertical to a horizontal plane, three independent folding wall sections hingedly connected along one of their sides to the free sides of said hingedly connected wall, means extending between certain of the fixed upright walls and two of said folding wall sections for supporting the latter in upright position and means between said two folding wall sections and the third folding section for supporting the latter in extended position, and said one hingedly connected upright wall being of the same height as the other upright walls.

BENNIE P. HANSON.